(12) United States Patent
Phillips et al.

(10) Patent No.: US 9,569,564 B2
(45) Date of Patent: Feb. 14, 2017

(54) AUTOMATED CAD PROCESS FOR CREATING MOLD PACKAGES

(71) Applicant: Ford Motor Company, Dearborn, MI (US)

(72) Inventors: John Phillips, Ann Arbor, MI (US); Varinder Singh Saini, Toronto (CA); Scott Gafken, Clinton Township, MI (US); Richard Raymond Urban, Canton, MI (US); Paul Christopher Susalla, South Lyon, MI (US); Lixing Ma, Troy, MI (US); Yuan-Ping Hu, Troy, MI (US); David Michael Boren, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 511 days.

(21) Appl. No.: 13/763,900

(22) Filed: Feb. 11, 2013

(65) Prior Publication Data

US 2014/0228997 A1    Aug. 14, 2014

(51) Int. Cl.
*G06F 17/50* (2006.01)
*G06T 17/10* (2006.01)
*G05B 19/40* (2006.01)
*G05B 19/4097* (2006.01)

(52) U.S. Cl.
CPC ........... *G06F 17/50* (2013.01); *G05B 19/4097* (2013.01); *G06T 17/10* (2013.01); *G06F 2217/41* (2013.01); *Y02P 90/265* (2015.11)

(58) Field of Classification Search
CPC .. G06F 17/50; G06F 2217/41; G05B 19/4097; G06T 17/10
See application file for complete search history.

(56) References Cited

U.S. PATENT DOCUMENTS

| | | | | |
|---|---|---|---|---|
| 5,137,662 | A * | 8/1992 | Hull et al. | 264/401 |
| 5,184,307 | A * | 2/1993 | Hull et al. | 700/182 |
| 5,345,391 | A * | 9/1994 | Hull et al. | 700/182 |
| 5,455,778 | A * | 10/1995 | Ide | F01D 25/164 |
| | | | | 700/182 |
| 5,764,518 | A * | 6/1998 | Collins | B25J 9/1617 |
| | | | | 700/117 |
| 5,828,575 | A * | 10/1998 | Sakai | G05B 19/4097 |
| | | | | 700/182 |

(Continued)

*Primary Examiner* — Mohammad Ali
*Assistant Examiner* — Kelvin Booker
(74) *Attorney, Agent, or Firm* — Damian Porcari; Price Heneveld LLP

(57) ABSTRACT

The present invention provides methods to create a pattern part, and a subsequent mold core package, that can be used in the casting process to cast one or more die components having a near net-shape of the finished part. In this way, the present invention provides a cast part which greatly reduces the amount of finishing work that needs to be performed on the part after casting. Further, the present invention provides a method which involves less upfront stock material to cast the near net-shape of the desired die component part. The present invention accomplishes this by providing an efficient and effective automated method to determine where and how to add appropriate mechanical features to a design model part to produce a manufacturing model part in a CAD software program.

20 Claims, 5 Drawing Sheets

(56) References Cited

U.S. PATENT DOCUMENTS

| | | | |
|---|---|---|---|
| 5,876,550 A * | 3/1999 | Feygin | B22C 9/00 156/256 |
| 5,879,489 A * | 3/1999 | Burns | B22F 3/005 156/234 |
| 6,128,023 A | 10/2000 | Kawashima | |
| 6,253,116 B1 * | 6/2001 | Zhang | B29C 67/0055 700/119 |
| 6,341,460 B1 * | 1/2002 | Lalvani | B44C 3/12 52/311.2 |
| 6,477,686 B1 * | 11/2002 | Dewey, III | G06F 17/5036 378/108 |
| 6,542,937 B1 * | 4/2003 | Kask et al. | 719/328 |
| 6,754,556 B1 * | 6/2004 | Landers | G05B 19/4097 700/182 |
| 7,039,569 B1 | 5/2006 | Haws et al. | |
| 7,153,135 B1 * | 12/2006 | Thomas | A61B 5/1077 433/213 |
| 8,131,516 B2 | 3/2012 | Hindman et al. | |
| 8,305,376 B2 | 11/2012 | Ran et al. | |
| 8,836,701 B1 * | 9/2014 | Rockwood | 345/423 |
| 8,983,804 B2 * | 3/2015 | Houdouin et al. | 703/1 |
| 8,983,805 B2 * | 3/2015 | Rameau et al. | 703/1 |
| 9,315,663 B2 * | 4/2016 | Appleby | C08L 63/00 |
| 2002/0059049 A1 | 5/2002 | Bradbury et al. | 703/11 |
| 2002/0118187 A1 * | 8/2002 | Batori et al. | 345/419 |
| 2002/0118229 A1 * | 8/2002 | Batori et al. | 345/771 |
| 2002/0133253 A1 * | 9/2002 | Landers | G05B 19/4097 700/98 |
| 2002/0133264 A1 * | 9/2002 | Maiteh et al. | 700/182 |
| 2002/0133265 A1 * | 9/2002 | Landers | G05B 19/4097 700/182 |
| 2002/0133266 A1 * | 9/2002 | Landers | G05B 19/4097 700/182 |
| 2002/0133267 A1 * | 9/2002 | Landers | G05B 19/4097 700/182 |
| 2002/0133803 A1 * | 9/2002 | Landers | G05B 19/4097 717/104 |
| 2002/0152000 A1 * | 10/2002 | Landers | G05B 19/4097 700/98 |
| 2003/0004596 A1 * | 1/2003 | Landers | G05B 19/4097 700/98 |
| 2003/0191554 A1 * | 10/2003 | Russell et al. | 700/187 |
| 2003/0214503 A1 * | 11/2003 | Venkataraman | G06K 9/469 345/420 |
| 2004/0128648 A1 * | 7/2004 | Rappoport | G06T 17/00 717/105 |
| 2004/0133276 A1 * | 7/2004 | Lang et al. | 623/14.12 |
| 2004/0153200 A1 * | 8/2004 | Landers | G05B 19/4097 700/182 |
| 2004/0153201 A1 * | 8/2004 | Landers | G05B 19/4097 700/182 |
| 2004/0153202 A1 * | 8/2004 | Landers | G05B 19/4097 700/182 |
| 2004/0153296 A1 * | 8/2004 | Landers | G06F 17/50 703/2 |
| 2004/0174359 A1 * | 9/2004 | Takagi | 345/420 |
| 2004/0210429 A1 * | 10/2004 | Yu et al. | 703/9 |
| 2005/0102063 A1 * | 5/2005 | Bierre | G01C 15/002 700/247 |
| 2006/0041448 A1 * | 2/2006 | Patterson | G06Q 10/101 705/301 |
| 2006/0106476 A1 * | 5/2006 | Tornquist et al. | 700/98 |
| 2006/0106485 A1 * | 5/2006 | Landers | G05B 19/4097 700/182 |
| 2006/0106757 A1 * | 5/2006 | Sakai et al. | 707/2 |
| 2006/0155418 A1 * | 7/2006 | Bradbury | G05B 19/4099 700/182 |
| 2006/0282186 A1 * | 12/2006 | Hansen | B22D 46/00 700/97 |
| 2010/0298961 A1 * | 11/2010 | Frisken et al. | 700/103 |
| 2011/0087350 A1 * | 4/2011 | Fogel et al. | 700/98 |
| 2011/0153052 A1 * | 6/2011 | Pettibone et al. | 700/98 |
| 2011/0189440 A1 * | 8/2011 | Appleby | B22C 9/04 428/156 |
| 2012/0109350 A1 * | 5/2012 | Buchowski et al. | 700/98 |
| 2012/0109589 A1 * | 5/2012 | Thompson et al. | 703/1 |
| 2012/0109591 A1 * | 5/2012 | Thompson et al. | 703/1 |
| 2012/0232685 A1 * | 9/2012 | Wang | G06F 17/5018 700/98 |
| 2013/0046511 A1 * | 2/2013 | Tayal et al. | 703/1 |
| 2013/0080121 A1 * | 3/2013 | Gibson | G06F 17/50 703/1 |
| 2013/0104251 A1 * | 4/2013 | Moore | G06F 21/602 726/30 |
| 2013/0116990 A1 * | 5/2013 | Montana | G06T 19/00 703/2 |
| 2013/0211531 A1 * | 8/2013 | Steines | A61F 2/4684 623/20.35 |
| 2014/0039847 A1 * | 2/2014 | Georgescu | G06F 9/4881 703/1 |
| 2014/0136156 A1 * | 5/2014 | Divekar | G06T 19/20 703/1 |
| 2014/0144470 A1 * | 5/2014 | Sewell | B01F 3/04503 134/18 |
| 2014/0158448 A1 * | 6/2014 | McCormick | B60K 6/20 180/242 |
| 2014/0172152 A1 * | 6/2014 | Bain | G05B 19/4097 700/190 |
| 2014/0184594 A1 * | 7/2014 | Janvier | G06T 17/005 345/420 |
| 2014/0188439 A1 * | 7/2014 | Rorato | G06F 17/5004 703/1 |
| 2014/0228860 A1 * | 8/2014 | Steines | A61F 2/30942 606/130 |
| 2015/0294502 A1 * | 10/2015 | Bonner | G06T 17/20 345/420 |

* cited by examiner

AUTOMATED CAD PROCESS FOR CREATING MOLD PACKAGES

FIELD OF THE INVENTION

The present invention generally relates to a method of creating sand mold packages using computer aided design (CAD) software, and more specifically, to an ancillary computer implemented method for use with current CAD software to automate methods of pattern recognition and geometry allocation for automatically converting a design model part to a manufacturing model part within the CAD software program, from which a mold package can be created using additive manufacturing for ultimately casting a die component part using the mold package.

BACKGROUND OF THE INVENTION

Die components, such as trim steels, scrap cutters, flange steels, form steels, pierce inserts, trim inserts, button block inserts, and the like, are components of a stamping die assembly that are used to form and cut away excess sheet steel from a vehicle part, such as a hood, door panel, or other like part being formed. Any number of die components can be used per stamping die assembly, each die component having a unique configuration and function. In the past, the common method for producing die components involved an investment casting process, which required a pattern maker to glue Styrofoam® pieces together in an approximate shape of a desired die component and then fine tune that approximate shape by machining the Styrofoam® into the shape and size of the actual die component to be cast. Recently, this technology has been referred to as subtractive manufacturing, wherein Styrofoam® pieces, metallic blocks or other such billets have been machined down to the approximate shape of a die component. Additive manufacturing techniques, such as sand printing, have all but eliminated the need to form such parts using subtractive manufacturing techniques. Using subtractive manufacturing techniques, extra machining stock, as much as 10 mm, is left on the subtractively manufactured pattern part and the resulting casting. This extra casting stock must be machined using a lengthy process, which involves scanning the object and creating a CNC program that is based on the actual shape of the desired die component part. Having the extra machining stock on the final cast part requires multiple rough machining steps, especially when a cutting edge is desired on the die component. The multiple rough machine steps are necessary because the extra stock on the cast part often exceeds the penetration depth of the CNC machine, such that the extra stock must first be removed through multiple rough cut operations. The cast part must also be hardened between rough machining processes and, finally, finish machined. The present invention eliminates several of the post-casting steps involved in making a finished die component by using additive manufacturing techniques.

Presently, computer aided design (CAD) software is used to facilitate the electronic designing of complex three-dimensional (3D) models of mold packages used to produce cast parts. In developing a mold package, the CAD software must first create a manufacturing model part from a design model part. This requires adding specific features which make the manufacturing model part castable using a molten material, such as a molten tool steel alloy. Mechanical features desired in the manufacturing model part require the CAD operator to add stock material on machine surfaces, add witness mark pockets on base surfaces, fill in threaded screw holes and dowel holes, add fillets to various sharp edges in the design model parts, and other preparations within the CAD software. At present, all these preparations have to be done manually and they are very tedious and time consuming given the multitude of die component parts needed for any given stamping job. Thus, a need exists for a supplemented ancillary computer implemented method to be used with present CAD software that is capable of auto-generating the manufacturing model part from a design model part having the desired mechanical features within the CAD software.

SUMMARY OF THE INVENTION

One aspect of the present invention includes a computer implemented method for converting a design model part of a die component to a manufacturing model part in a solid modeling application in a computer aided design (CAD) program. The conversion method includes the steps of obtaining a three-dimensional design model part and selecting a reference face on the design model part. The method then includes the step of identifying or recognizing a base face of the design model part using the reference face. A geometric pattern of the design model part is then recognized and machined features necessary to create the manufacturing model part are identified. A manufacturing model part is then generated within the solid modeling application by adding the identified machined features to the design model part.

Another aspect of the present invention includes a computer implemented method for converting a design model part of a die component to a manufacturing model part in a solid modeling application in a computer aided design (CAD) program. The conversion method includes the steps of obtaining a three-dimensional design model part and selecting a reference face disposed on the design model part. The parameters of the reference face are then identified and a base face of the design model part is identified or recognized using the parameters of the reference face. A geometric pattern of the design model part is then recognized for the design model part within the solid modeling application. Apertures disposed on the base face are recognized and removed and a manufacturing model part is then generated by adding material stock to the design model part.

Yet another aspect of the present invention includes a computer implemented method for converting a design model part of a die component to a manufacturing model part in a solid modeling application in a computer aided design (CAD) program. The conversion method includes the steps of obtaining a three-dimensional design model part and selecting a reference face on the design model part. A top face of a mounting plate is then identified and a top face boundary, as defined by intersections between the top face and adjacent faces, is identified. Each intersection is evaluated and a determination is made as to whether a specific intersection requires a fillet. If a specific intersection requires a fillet, then a fillet is added. Finally, a manufacturing model part is generated in the solid modeling application.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 9:
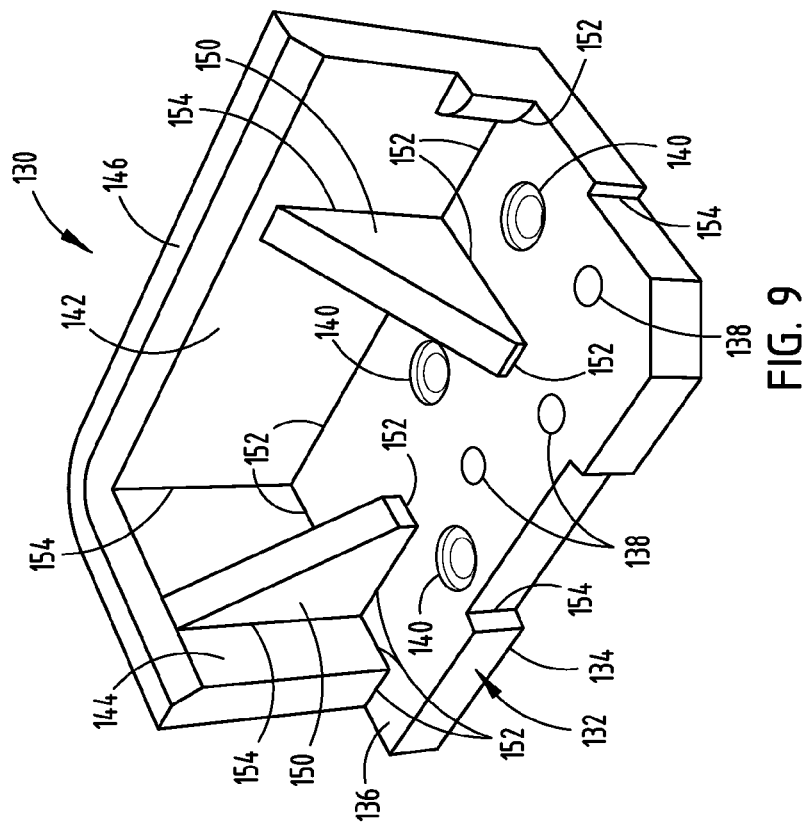
FIG. 9 is a perspective view of a design model part.

For purposes of description herein, the terms "upper," "lower," "right," "left," "rear," "front," "vertical," "horizontal," and derivatives thereof shall relate to the invention as oriented in FIG. 9. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention generally relates to an automated method of pattern recognition and geometry allocation as it relates to the conversion of a design model part to a manufacturing model part within in CAD program. As used throughout this disclosure, the term "design model part" refers to a part, such as a die component part, as machined, and the term "manufacturing model part" refers to a part, such as a die component part, as cast. The pattern recognition and geometry allocation incorporated into the present invention is fundamental in converting from a design model part to a manufacturing model part in a CAD based part design program.

A user of the present invention, likely a consumer in the stamping industry, will use the manufacturing model part in a Printed Sand Casting Process to create precision cast blanks of die components. To this end, the user requires a Catia V5 CAA based application, or other like application, that will produce a manufacturing model CATPart from a die design model small cast item CATPart. The automated manufacturing model creation process of the present invention is targeted as a post die design release process, therefore the application of the present invention should be easy to use and require minimal input as the targeted user may not be an experienced CAD operator.

In order to complete the transformation, there are several mechanical features that need to be added to specific locations on the design model part to create the manufacturing model part. These mechanical features are provided on the design model part through a series of automated process steps undertaken by the computer implemented method of the present invention. These steps may include any combination of the machined feature adding processing steps listed in Table 1 below:

TABLE 1

| 1 | Removing threaded screw and dowel holes |
| 2 | Adding blade top and side stock material |
| 3 | Adding counterbore seating face thickness |
| 4 | Adding joint and heel machining face thickness |
| 5 | Adding blade edge filleting |
| 6 | Adding counterbore top filleting |
| 7 | Adding inner corner edge filleting |
| 8 | Adding other inner edge filleting |
| 9 | Adding Witness Marks |

The feature adding process steps identified in Table 1 require specific pattern recognition and geometry allocation in order for the CAD program to determine where to insert a particular mechanical feature. It is noted that Table 1 is provided as an exemplary table of feature adding processing steps for adding mechanical features to a particular design model part. Other steps and corresponding mechanical features may be necessary when forming other specific die components. The method of pattern recognition and geometry allocation necessary to complete any one of the processing steps identified in Table 1 will now be described.

Figure 1:
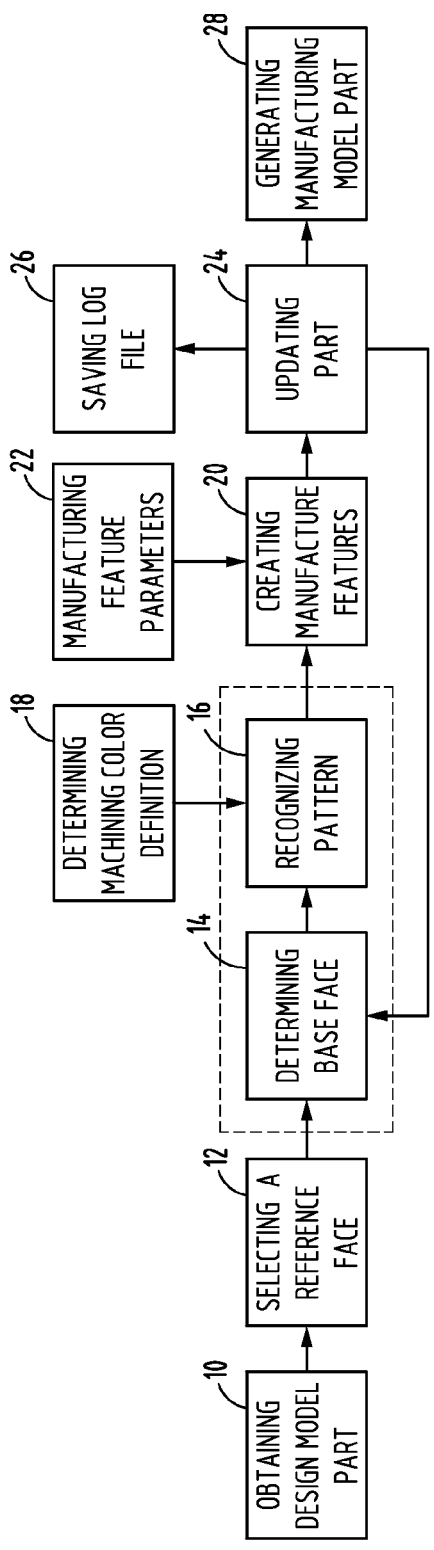
FIG. 1 is a flow chart for a converting process of a design model part to a manufacturing model part.

Referring now to FIG. 1, an overview flowchart for a conversion process of a design model part to a manufacturing model part is shown. Specifically, FIG. 1 is a diagrammatic view depicting an overview of the function of the computer implemented method of the present invention for manufacturing model creation (MMC), wherein a CAD design of a design model part, or "as machined" part, is converted to a manufacturing model part, or "as cast" part. When converting a CAD design model part to a manufacturing model part, the CAD operator, generally a design engineer, first calls up or obtains a 3D design model part 10 having a specific geometric configuration or pattern with a plurality of surfaces that are generally color coded within the CAD program to specifically identify the various machine surfaces that make up the design model part. The design model part is generally called up in a Catia V5 session with the die design assembly that contains the targeted small cast items opened for viewing. This would put the V5 session in Assembly Design workbench mode. After picking the MMC icon, the user would be prompted to select the target detail or tool from the die assembly. The application would then provide an auxiliary view, generally viewable using a graphical user interface (GUI) based module, of the detail in its current die assembly orientation which will allow the user to zoom and rotate the die component and prompt the user to select particular features of the design model part as further described below.

The 3D design model part is comprised of a collection of interconnected topological features such as faces, vertices and edges. These features have supporting geometrical aspects encoded therein. After calling up the design model part 10 in a solid modeling application, the CAD operator selects a reference face 12 using interactive CAD system commands or MMC graphical user interface (GUI). The geometrical information of the reference face is then obtained 14, including, but not limited to, the face normal vector and the center point of the reference face. The MMC software then determines the base face 14 of the design model part according to the geometrical information of the selected reference face obtained in step 12A (FIG. 2) and also by using the surface information of the selected reference face found in a Machining Color Definition Index, often referred to as a Color Chart or Color Index, provided in the CAD program. By recognizing the base face 14 of the design model part, the present invention provides a convenient and effective recognition method or algorithm to automatically and precisely identify the base face of the design model part as further described below. In order to introduce the mechanical features, such as any one of the mechanical features listed in Table 1, a corresponding recognition algorithm must be provided as described below.

As found in Table 1, there are four categories of fillets that can be added to different edges identified in a design model part. As noted above, the design model part comprises a plurality of surfaces, wherein the surfaces intersect to form surface intersections with adjacent surfaces or have terminating edges which may require fillets in converting the design model part to the manufacturing model part. In the industry, a fillet is generally considered a concave easing of an interior corner of two intersecting surfaces or a rounding of an exterior edge often called a "round" or "chamfer." Depending on the location of edges or surface intersections, these fillets have different functionalities including the reinforcement of points or lines of expected high stress, wherein the fillet can distribute the stress over a broader area such that the manufacture model part is more durable and capable of bearing larger loads for a prolonged production life as compared to other die components lacking such filleted reinforcement. The incorporation of fillets to concave corners can allow for round tipped end mill cutting devices to be used in the creation or machining of the manufactured model part. Further, the fillets can offer rounding to particular edges to eliminate sharp edges that can be easily damaged or that are a potential for injury when the manufacturing model part is handled by a die operator. The filleting of edges and intersections of surfaces also generally contributes to an overall pleasing aesthetic appearance of the finished manufacturing model part.

According to the unique functionality of a desired fillet at a particular location on a manufacturing model part, different fillet radii are employed as further described below. Different fillet radii can be used for different features of the manufacturing model part, such as when filleting a blade edge, a counterbore top, an inner corner edge at an intersection of surfaces, or other for reinforcement at inner edges on the design model part. In determining locations for fillet addition on a design model part, the need to add stock material to a machine surface of the design model part may arise. There are certain stock material thicknesses used for a blade top surface, a side face surface, a counterbore face surface, as well as joint and heel machine surfaces that must be precisely incorporated into the manufacturing model part from the design model part. In order to ensure the versatility and flexibility of the MMC program, these feature parameters, for the fillet radii and stock material thickness, are obtained by the CAD operator from a user controlled flavor list file. An exemplary flavor list of such specifications and parameters is shown below in Table 2. As noted above and illustrated in FIG. 1, the MMC implements the algorithms provided in the present invention to automatically recognize the pattern of the design model part in step 16, and therefrom determine the machine features that are to be incorporated into the design of the manufacturing model part from the listing of features found in Table 1. The required machining parameters are chosen from Table 2 according to the machine feature recognition results such that adequate material stock is added to the design model part for later forming any one feature found in Table 1.

TABLE 2

|   | Manufacture Feature | Thickness/Radius (mm) |
|---|---|---|
| 1 | Blade top face stock thickness | 1.5 |
| 2 | Blade side stock face thickness | 1.5 |
| 3 | Counterbore seating face thickness | 0.5 |
| 4 | Joint and heel face thickness | 1.5 |
| 5 | Blade edge fillete radius | 3 |
| 6 | Counterbore top fillet radius | 1 |
| 7 | Inner corner edge fillet radius | 10 |
| 8 | Other inner edge fillet | 2 |
| 9 | Other user defined machining feature | — |

As noted above, determining the base face 14 (FIG. 1) is an important factor in the computer implemented method of the present invention. Determining the base face of the design model part is a prerequisite for the subsequent geometric pattern recognition process 16 of the design model part. The base face of the design model part is a recognized face on a topological and geometrical level within the CAD system. The relation between the base face and the working part varies with updates that are made to the working part in the process of converting a design model part to a manufacturing model part. Thus, there are at least two reasons the base face recognition must be treated dynamically within the CAD system. First, the reference face selected by the CAD operator in step 12 (FIG. 1) may not actually belong to the current working product, or design model part. Secondly, the topological relation between the base face and the geometrical body of the working part is constantly updated when any mechanical features, such as the features found in Table 1, are created and added to the design model part during the conversion of the design model part.

Figure 2:
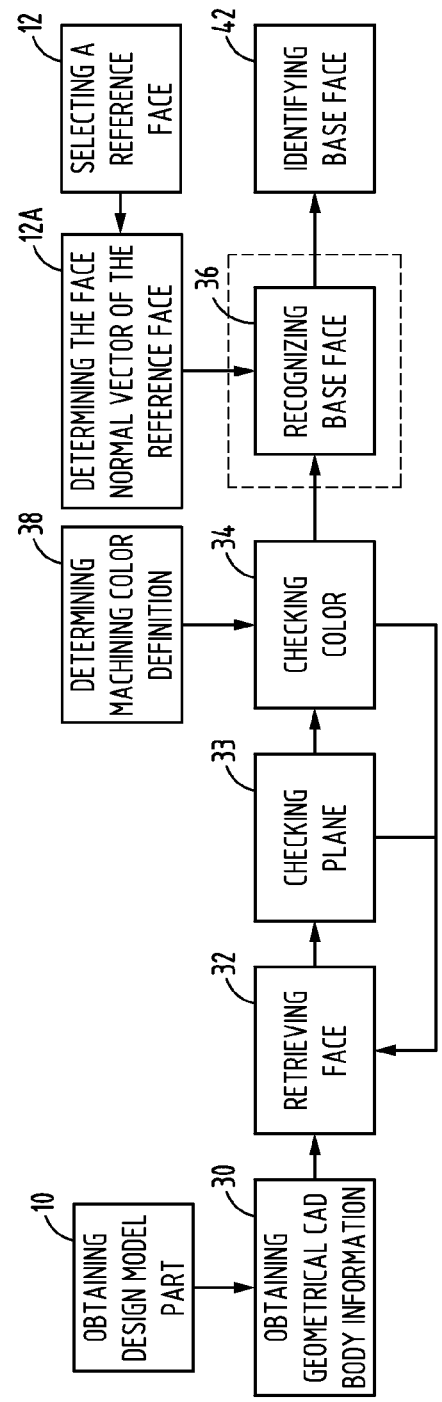
FIG. 2 is a flow chart for a base face recognition process.

Referring now to FIG. 2, a schematic diagram is shown of the base face recognition method used in the computer implemented method of the present invention. Generally, the base face of the design model part, as recognized by the MMC software, is a planar face on the design model part. Recognition of the base face is determined in the MMC software when the normal vector of a face and one of its arbitrary points satisfies Equation 1, which is noted below:

$$N_1 = N_0 \left( \frac{(P_1 - P_0) \cdot N_1}{N_0 \cdot N_1} \right) = 0 \quad \text{EQUATION 1}$$

The satisfaction of Equation 1 ensures that both the reference face selected by the CAD operator and the face retrieved by the CAD software are both planar faces which are located in an identical plane. In Equation 1 noted above, $N_0$ and $P_0$ are the normal vector and center point of the selected reference face which is selected in step 12 as shown in FIG. 1 by the CAD operator. Accordingly, $N_1$ and $P_1$ are respectively the normal vector and center point of the face retrieved from the CAD body and identified and recognized as the base face as found in step 14 of FIG. 1 by the computer implemented method of the present invention. If Equation 1 is not satisfied, another face is retrieved and tested until Equation 1 is satisfied and the base face is identified.

The specific methodology used to determine the base face of the design model part is exemplified and explained with reference to FIG. 2. As shown in FIG. 2, the design model part is selected in step 10, from which a geometrical CAD body is rendered 30. As noted above, a reference face 12 is selected and geometrical information of this reference face is obtained including the determination of the face normal vector and center point of the reference face 12A. A face is then retrieved 32 by the computer implemented method of the present invention, and this retrieved face undergoes a plain check 34 and a color check 36 by referencing the retrieved face with the Color Index or Color Chart available within the modeling software such as a CATIA program. The base face is then recognized 40 using the normal vector and center point of the selected reference face and the normal vector and center point of the face retrieved from the geometrical CAD body. These data points are entered into Equation 1, and if Equation 1 is satisfied, then the face retrieved from the CAD body is the base face and ergo, the base face is recognized or identified 42.

Figure 3:
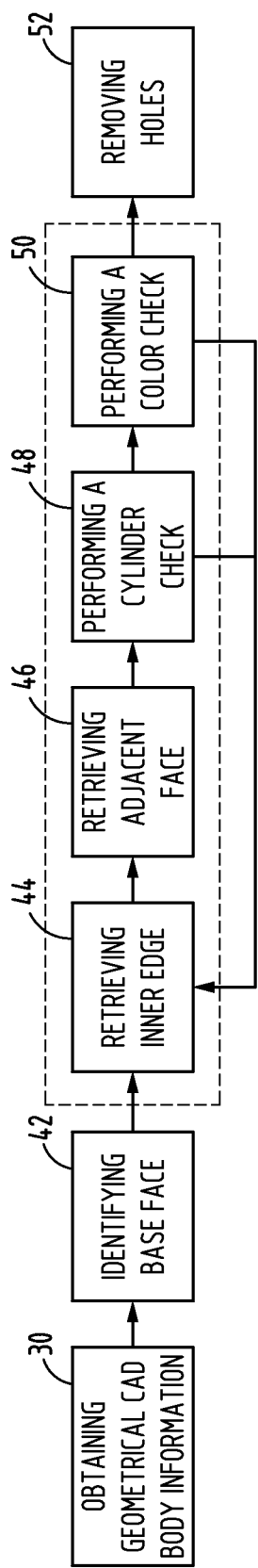
FIG. 3 is a flow chart for a threaded screw and dowel hole recognition process.

As found in Table 1 above, the removal of threaded screw and dowel holes is a component part of converting the design model part to the manufacturing model part. The method of recognition of the threaded screw and dowel holes on a CAD body is schematically depicted in FIG. 3, and will now be described. In the manufacturing model part, apertures for the threaded screw holes and dowel holes must be removed in the CAD program from the design model part. In the CAD program, the design model part should have the threaded screw holes and dowel holes properly assigned to color according to the Machine Color Definition Index within the CAD program thereby identifying the screw holes and dowel holes on the CAD body. In the art of die stamping and die component engineering, it is assumed that all of the screw holes and dowel holes are disposed on the base face of the die component. With the base face identified 42, an inner edge of the base face is retrieved 44 as shown in FIG. 3. Faces adjacent to the base face and inner edges are also retrieved 46. A cylinder check is then performed 48 along with a color check 50 to determine the exact type of machining surface that is associated with the face that is adjacent to the base face. The cylinder check 48 and color check 50 identify the threaded screw holes and dowel holes disposed on the base face of the design model part. Once identified, the threaded screw holes and dowel holes can be removed 52 by filling these holes or apertures with material in the CAD software, or simply by deleting the specific features within the software after recognition.

Figure 4:
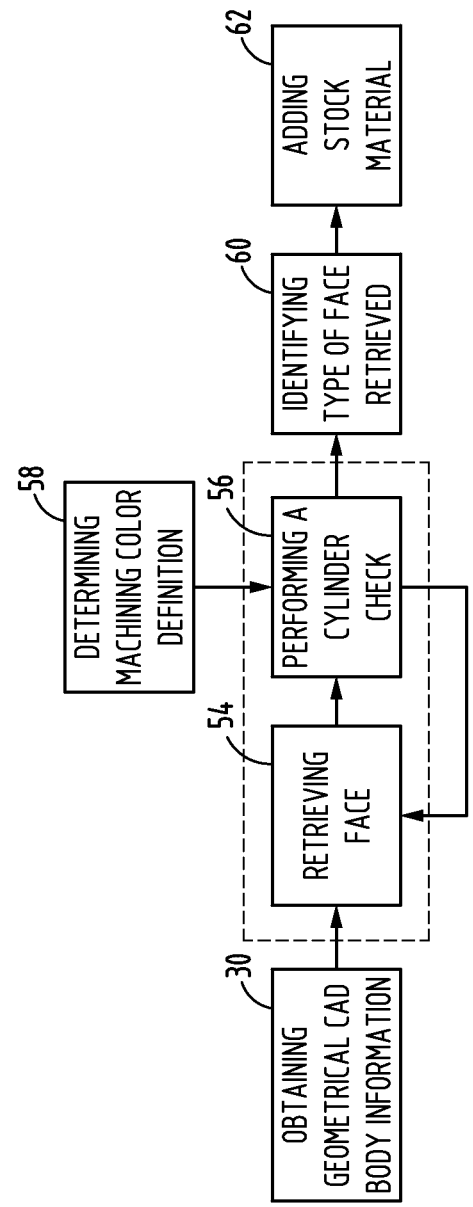
FIG. 4 is a flow chart for a machine face stock material addition recognition process.

Further, in converting the design model part to the manufacturing model part within a CAD program, material stock may be added to various machining surfaces such as the blade top and side surfaces, joint and heel surfaces, and counterbore top surfaces. These material stock additions are noted in Table 1 and are generally added in various amounts indicated in Table 2. Within the CAD software, the present invention uses the same method and algorithm of geometric pattern recognition of a CAD body to determine the particular machine faces incorporated into the design model part. It is assumed that each particular machining surface has been assigned an appropriate identifying color according to the Machine Color Definition Index. Thus, with reference to FIG. 4, a diagrammatic view of a recognition method for adding material face stock to a surface of a die component is shown. This recognition includes the steps of retrieving the geometrical CAD body 30, retrieving a face 54, performing a color check of the retrieved face 56 using the Machine Color Definition Index 58, determining the type of face retrieved 60 based on the results of the color check 56, and adding material stock 62 as necessary for the specific type of machine face retrieved. For example, a blade top face may be selected and once properly identified as such, the computer implemented method of the present invention will add 1.5 mm of material stock to that face as deemed necessary (in Table 2) for converting that face to the proper configuration for use in a manufacturing model part.

Figure 5:
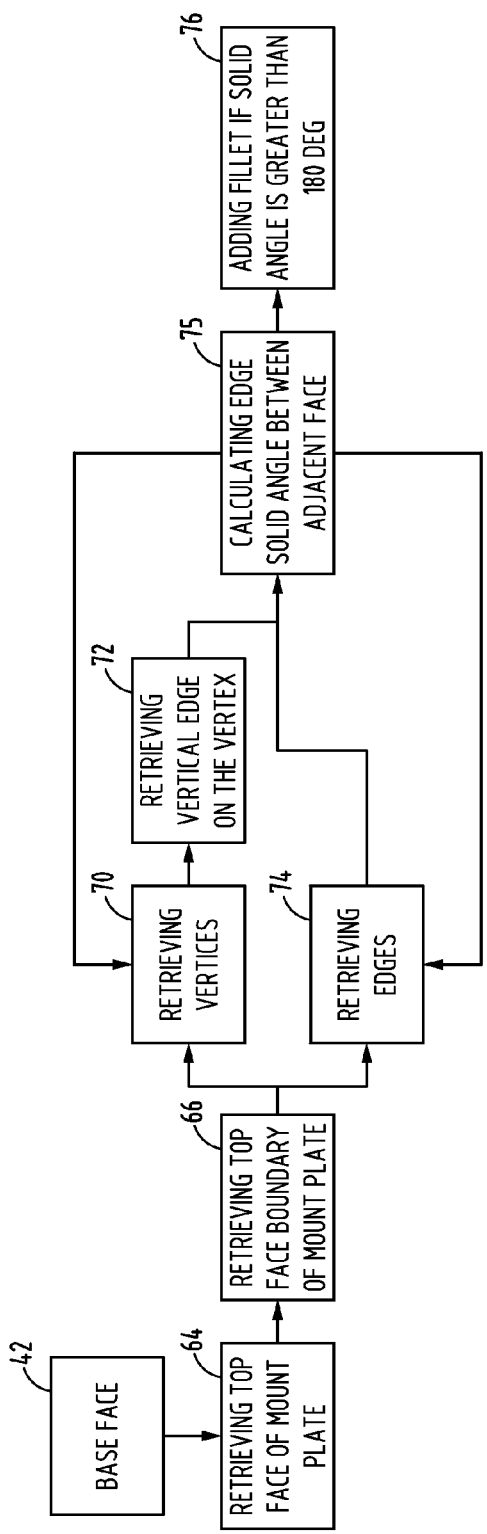
FIG. 5 is a flow chart of an internal corner edge recognition process.

The computer implemented method of the present invention must also identify internal corner edges for the placement of fillets as needed in the creation of the manufacturing model part. Referring now to FIG. 5, a schematic diagram is shown of the edge recognition algorithm used in the MMC software to efficiently and effectively recognize internal corner edges. The method, exemplified in FIG. 5, is based upon the assumption that reinforcement ribs or gussets disposed at various locations on the design model part are disposed on a top surface of a mounting plate of the design model part. According to this assumption, all lower horizontal edges of the ribs are directly disposed on the boundary of the top face of the design model part. Lower vertices of the rib vertical edges are also the vertices of the boundary of the top face in the design model part. The angle between two adjacent faces is determined and used to judge whether or not the intersection of the faces is an edge that requires a fillet. Therefore, a geometrical analysis is performed on the top face boundary parameters using the vertices of the top face boundary to determine or recognize a vertical rib edge. Further, using the edges on the top face boundary, horizontal blade and rib edges are identified and recognized. Thus, as shown in FIG. 5, the base face is identified 42 and from the base face recognition, the top face of the mounting plate of the design model part is retrieved 64. Next, the boundaries of the top face of the mounting plate are retrieved 66 and then the vertices 70 and edges 74 of the top face boundary of the mounting plate are retrieved. The edge solid angle between two adjacent faces is then calculated 75 using a retrieval edge on the top face boundary. If the edge solid angle (shown in FIG. 6) between the adjacent face and the mounting plate is calculated to be larger than 180 degrees, then a horizontal internal fillet edge is added 76. After the vertices of top face boundary are retrieved 70, vertical edges associated with each retrieved vertex of the top face boundary are retrieved 72. The vertical edges are formed by the intersection of two wall faces which are generally vertical in orientation relative to the top face. If the internal vertical edge solid angle is larger than 180 degrees, a fillet is needed and will be added to the design model part. From this information, the computer implemented method of the present invention determines whether or not to add a fillet 76 to a specific internal edge in an automated manner for both vertical and horizontal edges.

Figure 6:
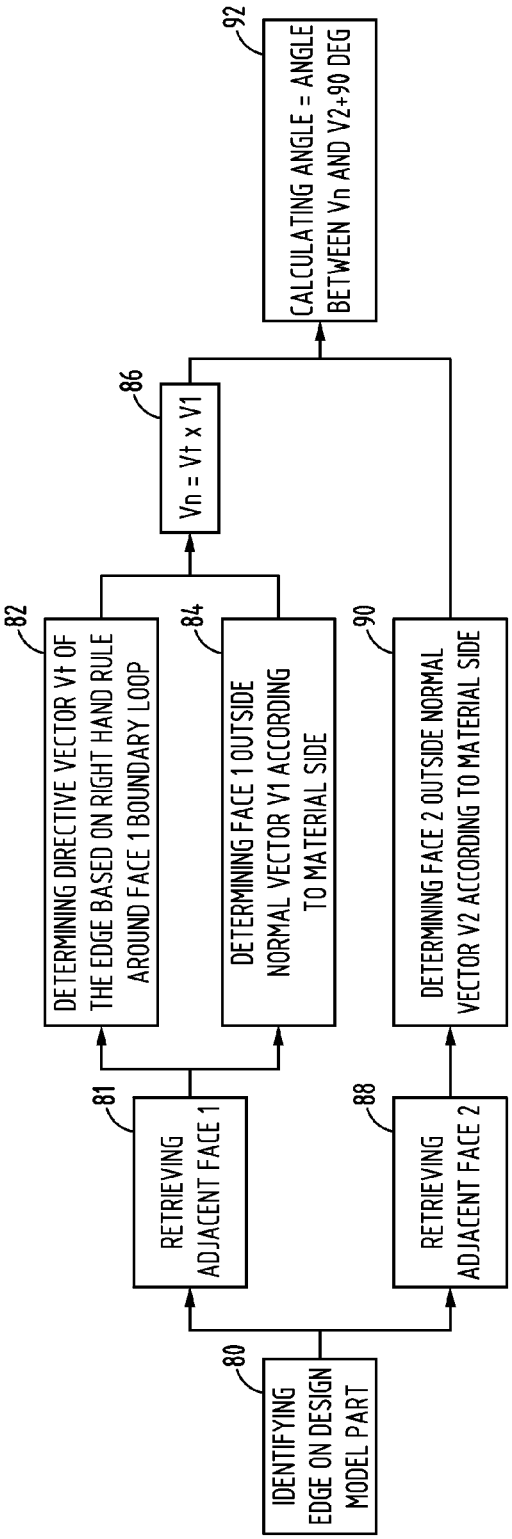
FIG. 6 is a flow chart for a solid edge angle calculation process.

The edge solid angle between adjacent faces on the CAD part body is calculated using the method depicted in FIG. 6. The edge solid angle is the angle within material side or solid side. There are generally two outside normal vectors on each face side of an edge, V1 and V2. Correspondingly, two angles can be obtained mathematically: one is the angle from V1 to V2 and another is from V2 to V1. The method shown in FIG. 6 determines which angle is the edge solid angle. Specifically, FIG. 6 indicates how the angle between the mounting plate and an adjacent face is calculated in step 75 of FIG. 5. This method is conducted by first determining and identifying an edge on the design model part 80. From there, an adjacent Face 1 is retrieved 82, from which a directive vector of the edge based on a right-hand rule with a Face 1 boundary loop is determined 82 to get a directive vector value Vt. Further, the Face 1 outside normal vector is determined based on a material side of Face 1 to get a V1 value 84 for the outside normal vector. From the Vt and V1 vector values, a $V_n$ value is calculated 86 using the equation $Vt \times V1 = V_n$. While the $V_n$ value is calculated, the computer implemented method of the present invention also retrieves another face, Face 2, step 88, which is also adjacent to the selected edge from which an outside normal vector value, V2 based on the material side is determined. When the $V_n$ has been calculated 86 and the V2 value has been determined 90, the angle between the adjacent face and the mounting plate is determined by calculating the angle between $V_n$ and V2 plus 90 degrees in step 92. Thus, as shown in FIG. 6, the solid edge angle calculation is an automated process performed in the computer implemented method of the present invention, and is used to determine if a fillet is needed.

Figure 7:
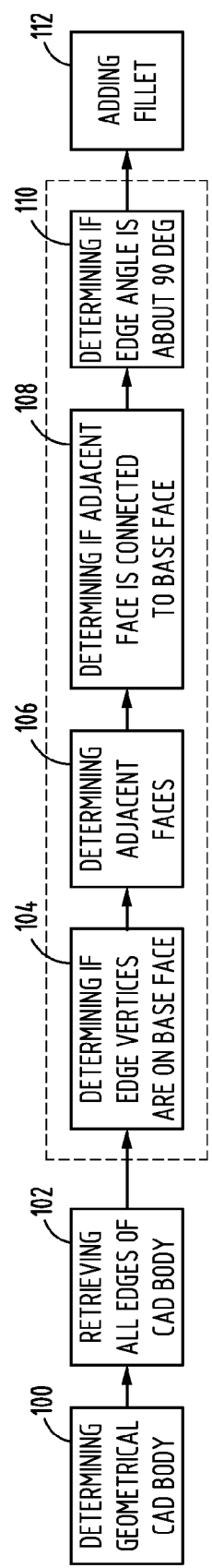
FIG. 7 is a flow chart for a side blade recognition process.

A side blade edge is located between a side blade bottom face and the outside of a trim steel wall when the die component being converted from a design model to a manufacturing model is a trim steel die component. Trim steels, and other die cutting tools, need side blade edge fillets to increase the robustness or strength of a trim steel, such that the trim steel will have a prolonged service life in use. Generally, the blade edge is directly disposed on an outside trim steel wall. The outside wall of the trim steel is generally joined to the mounting base plate of the trim steel. In identifying and recognizing the side blade, three assumptions are generally made. First, it is assumed that the side blade edge is not connected to the base face and mounting plate top face. Secondly, it is assumed that the adjacent face to the side blade edge connects to the base face. Finally, it is assumed that the angle between two of the adjacent faces of the side blade edge is about 90 degrees. Referring now to FIG. 7, the side blade recognition method is schematically depicted. In recognizing the side blade edge, the geometrical CAD body information is retrieved 100 and all edges of the design model part are retrieved 102. For each edge, it is determined whether or not the edge vertices are on the base face or the top face of the design model part 104. Next, the adjacent faces of a particular edge are determined 106. Next, it is determined whether or not the adjacent faces of a particular edge are connected to the base face 108. An angle determination is then made to see if the edge angle is about 90 degrees 110. If the edge angle is determined to be about 90 degrees, then a fillet is added to that edge 112 which is recognized as a blade edge.

Figure 8:
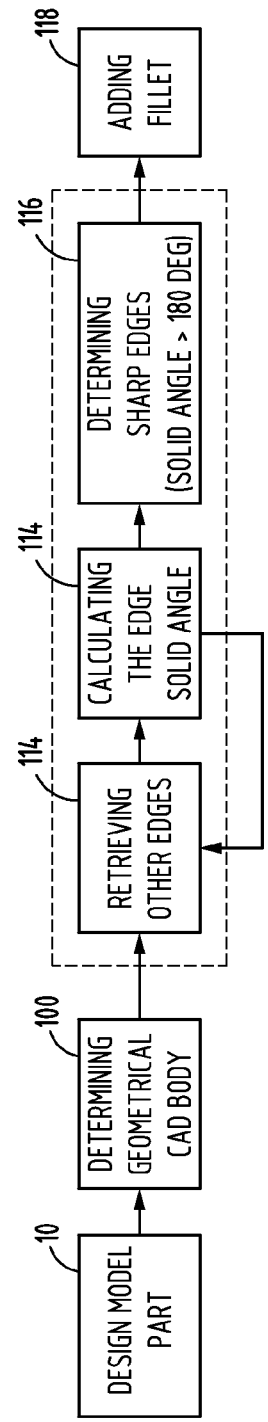
FIG. 8 is a flow chart for an inner edge recognition process.

When the fillets for items 5, 6 and 7, indicated in Table 1, have been added to the design model part, the MMC software must now work on adding fillets to other inner edges as indicated in item 8 of Table 1. Other inner edges on the design model part refer to sharp edges wherein the edge angle is greater than 180 degrees. Using the method described above, in reference to FIG. 6, the sharp edges can be identified or recognized with the corresponding geometry recognition method shown in FIG. 7. Referring now to FIG. 8, a schematic view of the recognition method used to determine other inner fillet edges is shown. First, the design model part is called up in the CAD software 10. Next, the geometrical CAD body of the design model part is determined 100. The other edges, not previously identified and recognized, are retrieved 114 and a determination is made as to whether or not the edges are sharp edges 116, or greater than 180 degrees. The sharp edge is determined and retrieved based on the calculation of the solid angle 115. The edge with a solid angle larger than 180 degrees is recognized as the sharp edge. If the retrieved edge is determined to contain a sharp edge in step 116, the need for a fillet is recognized and a fillet is then added to the design model part 188.

Figure 10:
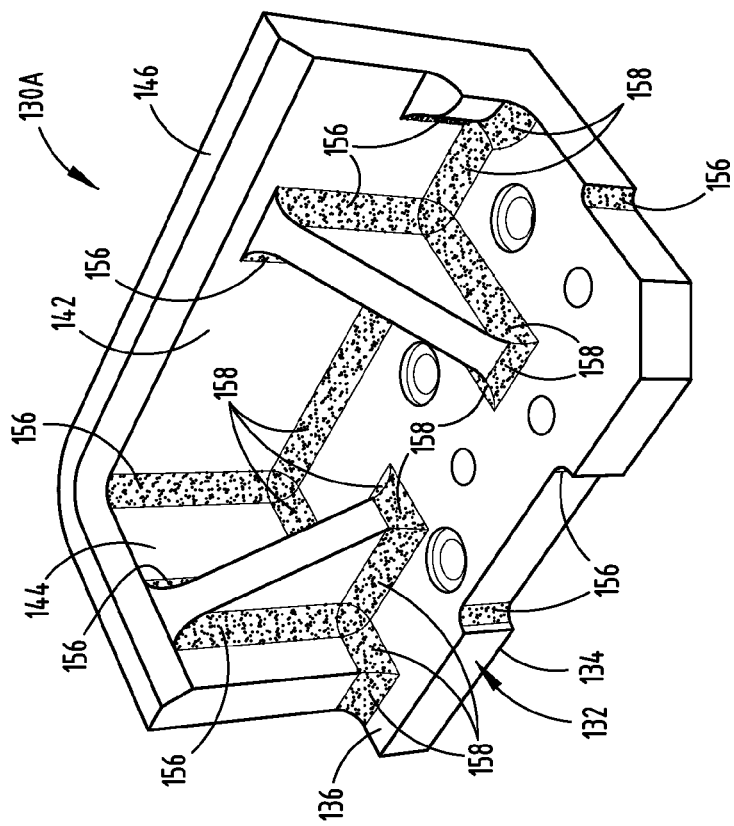
FIG. 10 is a perspective view of the design model part of FIG. 9 including a plurality of fillets.

Referring now to FIGS. 9 and 10, a trim steel part 130 is shown and will be used to describe the method of adding fillets to various locations on the trim steel 130 as automated by the computer implemented method of the present invention. While the present invention is demonstrated using a trim steel component, it is contemplated that the present invention can be used to create castable manufacturing parts for any cast steel component in the tooling industry. As shown in FIG. 9, the trim steel 130 is a die model or design model part which is converted to a manufacturing model part 130A as shown in FIG. 10. Referring to FIG. 9, the design model part 130 comprises a base 132 having a base face 134 and a mounting face 136. Disposed on the base 132 of the trim steel 130 are dowel holes 138, which are used to properly position the trim steel 130 on a die apparatus. The base 132 of the trim steel 130 further includes cap screw holes 140, which are used to bolt the trim steel 130 to a die assembly. Adjacent to the base 132 of the trim steel 130 are first and second edge surfaces 142, 144. A trim edge plate or blade edge 146 is disposed on the upper part of the edge surfaces 142, 144 as shown in FIG. 9. The blade edge 146 will be used in the die stamping process to trim a portion of a sheet metal part used in the die stamping process. Reinforcement or strengthening gussets 150 are shown which connect the outside edge surfaces 144, 142 with the mounting surface or mounting plate 136. A plurality of internal edges 152 are formed between the edge surfaces 142, 144 and the strengthening gussets or ribs 150 are shown which connect the edge surfaces 144, 142 with the mounting surface or mounting plate 136. Thus, the computer implemented method of the present invention is used to determine the geometrical CAD body of the trim steel 130 shown in FIG. 9. From this design model, the base face 134 is determined and the top face 136 of the base 132 is also determined as shown in steps 42 and 64 of FIG. 5. The top face boundary of the mounting plate or surface 136 is then determined in step 66 as shown in FIG. 5. The inner edges 152 are then retrieved as shown in step 74 of FIG. 5, and vertical edges 154 are also determined in step 72 of FIG. 5. Once the horizontal edges 152 and vertical edges 154 have been identified, with the angle calculations determined based on the method of FIG. 6, the computer implemented method of the present invention determines whether or not a fillet is to be added. With reference to FIG. 10, vertical fillets 156 and horizontal fillets 158 have been added to the vertical edges 154 and horizontal inner edges 152 identified on the design model part 130 in FIG. 9. Thus, the trim steel 130A, as shown in FIG. 10, has been processed according to the parameters of the supplemental software package of the present invention for reinforcement at critical points by adding fillets 156, 158 as deemed necessary by the software of the present invention in an automated manner.

Thus, as noted above the computer implemented method of the present invention is capable of automating a variety of procedural steps that must be taken when converting a design model part to a manufacturing model part when working with a design model in a solid modeling application. As noted above, it is necessary to convert the design model part to a manufacturing model part within a solid modeling computer application in order to make a die component, such as a trim steel, into a part that can be cast from a mold package. Thus, the present invention further automates the creation of a mold package based on the digital configuration of the manufacturing model part produced within the solid modeling computer application by the process as noted above. Once a mold package has been generated in a Mold Design Creation (MDC) application, which can be a single mold package or a series of multiple mold packages, this information can be uploaded for use in an additive manufacturing technique, such as 3D printing, sand printing, laser sintering or other like additive manufacturing techniques. Once the mold package has been created, a molten material will be cast in that mold package for producing the manufacturing model part or as-cast part. This part, once cast, can be further machined for use in a die stamping process. Thus, the present invention provides for an automated system of converting a design model part to a manufacturing model part from which a mold package is created having a negative image of the manufacturing model part, such that a tangible part can be created by casting a molten material using the mold package developed by additive manufacturing. While sand printing and laser sintering systems have been specifically identified in this application, it is contemplated that the present invention can be used with any additive manufacturing technique which requires a computer aided design model for creating a mold package.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A computer implemented method for converting a design model part to a manufacturing model part in a solid modeling application, comprising:
   obtaining a three-dimensional design model part and selecting a reference face therefrom;
   obtaining a retrieved face and identifying a base face that corresponds to the reference face;
   providing a set of potential mechanical features, each potential mechanical feature of the set of potential mechanical features corresponding to a predetermined topological configuration;
   recognizing a geometric pattern of the design model part that matches at least one of the predetermined topological configurations relating to the set of potential mechanical features, the geometric pattern relating to the identified base face;
   identifying new structural machined features for a manufacturing model part, wherein the new structural machined features are defined by the potential mechanical features relating to the matching topological configurations recognized in relation to the geometric pattern, wherein the identified new structural machined features are free of definition within the recognized geometric pattern;
   generating a manufacturing model part by adding the new structural machined features to the design model part based upon the geometric pattern of the design model part; and
   forming a printed sand casting of the manufacturing model part.

2. The computer implemented method of claim 1, wherein the step of identifying a base face that corresponds to the reference face further includes the steps of:
   identifying normal vector $N_0$ and center point $P_0$ of the reference face;
   identifying normal vector $N_1$ and center point $P_1$ of the retrieved face; and
   determining if the retrieved face is the base face of the design model part.

3. The computer implemented method of claim 2, wherein the step of determining if the retrieved face is the base face of the design model part further includes the steps of:
   incorporating the normal vector $N_0$ and center point $P_0$ of the reference face and the normal vector $N_1$ and center point $P_1$ of the retrieved face into an equation; and
   determining whether the normal vector and center point of the retrieved face satisfy the equation.

4. The computer implemented method of claim 3, wherein the normal vector $N_0$ of the reference face and normal vector $N_1$ of the retrieved face are equivalent and, further wherein the equation to be satisfied is the equation:

$$\left( \frac{(P_1 - P_0) \cdot N_1}{N_0 \cdot N_1} \right) = 0$$

and wherein $N_0 = N_1$, wherein if the equation is not satisfied, a different face is retrieved and the equation is used to determine whether the different face is co-planar with the base face such that the equation is satisfied.

5. The computer implemented method of claim 1, wherein the step of generating a manufacturing model part by adding the new structural machined features to the design model part includes adding new structural machined features selected from the group consisting of threaded screw hole material, dowel hole material, counterbore seating face thickness, joint and heel machining face thickness, blade edge filleting, counterbore top filleting, inner corner edge filleting, inner edge filleting, and witness marks.

6. The computer implemented method of claim 5, wherein the step of generating a manufacturing model part by adding the new structural machined features to the design model part further includes adding material stock to the design model part at locations designated for the new structural machined features to be added.

7. A computer implemented method for converting a design model part of a die component to a manufacturing model part in a solid modeling application, comprising:
   obtaining a three-dimensional design model part;
      selecting a reference face disposed on the design model part;
   identifying parameters of the reference face;
      obtaining a retrieved face and identifying a base face of the design model part that corresponds to the parameters of the reference face;
   providing a set of potential structural elements, each potential structural element of the set of potential structural elements corresponding to a predetermined topological configuration;
   recognizing a geometric pattern of the design model part within the solid modeling application, wherein the recognized geometric pattern corresponds to the identified base face and matches the predetermined topological configuration that relates to the potential structural element indicative of a removal of at least one aperture of the design model part;
   removing at least one aperture identified on the base face; and
   generating a manufacturing model part by adding material stock to the design model part, wherein the added material stock defines the new structural element, wherein the manufacturing model part is generated using a printed sand casting process.

8. The computer implemented method of claim 7, wherein the step of identifying parameters of the reference face further includes the step of identifying the normal vector $N_0$ and center point $P_0$ of the reference face.

9. The computer implemented method of claim 8, wherein the step of identifying the base face of the design model part that corresponds to the parameters of the reference face further includes the steps of:
identifying the normal vector $N_1$ and center point $P_1$ of the retrieved face; and
determining whether the retrieved face is co-planar with the base face of the design model part by satisfying the equation:

$$\left(\frac{(P_1 - P_0) \cdot N_1}{N_0 \cdot N_1}\right) = 0$$

and wherein $N_0 = N_1$, wherein if the equation is not satisfied, a different face is retrieved and the equation is used to determine whether the different face is co-planar with the base face such that the equation is satisfied.

10. The computer implemented method of claim 9, wherein the apertures identified on the base face are selected from the group consisting of dowel holes and threaded screw holes.

11. The computer implemented method of claim 9, including:
providing a Color Index identifying features of the design model part by color.

12. The computer implemented method of claim 11, wherein the step of generating a manufacturing model part by adding material stock to the design model part further includes the steps of:
retrieving a face;
performing a color check of the retrieved face using the Color Index;
determining a type of face retrieved based on results of the color check; and
wherein if the retrieved face includes one of a blade top face, a blade side face, counterbore seating face, joint and heel face, blade edge fillet, counterbore top fillet, inner corner edge fillet and other inner edge fillet:
adding material stock to the retrieved face according to parameters identified in a machining parameters table provided in the solid modeling application.

13. A computer implemented method for converting a design model part to a manufacturing model part in a solid modeling application, comprising:
obtaining a three-dimensional design model part and identifying a base face thereon that corresponds to a reference face of the three-dimensional design model part;
identifying a top face of a mounting plate that corresponds to the identified base face;
identifying a top face boundary as defined by intersections between the top face and adjacent faces;
determining if an intersection requires a new structural fillet, wherein a new structural fillet is to be added where the identified intersection matches a predetermined topological configuration that corresponds to a structural fillet adding instruction;
adding the new structural fillet to the intersection according to the structural fillet adding instruction;
generating a printed sand casting that combines the obtained three-dimensional design model part and the new structural fillet; and
generating a manufacturing model part using the printed sand casting.

14. The computer implemented method of claim 13, wherein the design model part is a design model of a die component.

15. The computer implemented method of claim 14, wherein the step of identifying a top face boundary as defined by intersections between the top face and adjacent faces further includes the steps of:
retrieving edges of the top face boundary;
retrieving vertices of the top face boundary; and
retrieving a vertical edge for each retrieved vertex.

16. The computer implemented method of claim 15, wherein the steps of determining if an intersection requires a fillet and adding fillets to intersections further includes the steps of:
calculating the edge solid angle between an adjacent face and the top face; and
wherein if the edge solid angle between the adjacent face and the top face is greater than 180 degrees:
adding the new structural fillet at the intersection.

17. The computer implemented method of claim 16, wherein the step of calculating the edge solid angle between an adjacent face and the top face further includes the steps of:
retrieving a first face which is adjacent to the top face of the mounting plate;
determining a directive vector Vt and an outside normal vector V1 of the first face;
multiplying the directive vector Vt and the outside normal vector V1 of the first face to get a value $V_n$;
retrieving a second face which is adjacent to the top face of the mounting plate;
determining an outside normal vector V2 of the second face;
calculating an angle between $V_n$ and V2;
adding 90 degrees to the angle; and
determining whether the edge solid angle between the adjacent face and the top face is greater than 180 degrees.

18. The computer implemented method of claim 13, wherein the steps of identifying a top face boundary as defined by intersections between the top face and adjacent faces and determining if an intersection requires a fillet further includes the steps of:
determining if the adjacent faces are attached to the top face;
calculating edge angle values between adjacent faces and the top face;
determining if the edge angle values are about 90 degrees; and
wherein if the edge solid angle between the adjacent face and the top face is about 90 degrees:
adding the new structural fillet at the intersection.

19. The computer implemented method of claim 13, wherein the step of obtaining a three-dimensional design model part and identifying a base face thereon that corresponds to a reference face of the three-dimensional design model part further includes the steps of:
Selecting the reference face;
identifying normal vector $N_0$ and center point $P_0$ of the reference face;
obtaining a retrieved face;

identifying normal vector $N_1$ and center point $P_1$ of the retrieved face; and determining if the retrieved face is the base face of the design model part.

20. The computer implemented method of claim 19, wherein the step of determining if the retrieved face is the base face of the design model part further includes the steps of:

incorporating the normal vector $N_0$ and center point $P_0$ of the reference face and the normal vector $N_1$ and center point $P_1$ of the retrieved face into an equation; and determining whether the normal vector and center point of the retrieved face satisfy the equation;

wherein the equation to be satisfied is the equation:

$$\left(\frac{(P_1 - P_0) \cdot N_1}{N_0 \cdot N_1}\right) = 0$$

and further wherein $N_0 = N_1$, wherein if the equation is not satisfied, a different face is retrieved and the equation is used to determine whether the different face is co-planar with the base face such that the equation is satisfied.

* * * * *

UNITED STATES PATENT AND TRADEMARK OFFICE
CERTIFICATE OF CORRECTION

PATENT NO. : 9,569,564 B2  
APPLICATION NO. : 13/763900  
DATED : February 14, 2017  
INVENTOR(S) : John Phillips et al.

Page 1 of 1

It is certified that error appears in the above-identified patent and that said Letters Patent is hereby corrected as shown below:

On the Title Page

Assignee, Line 17, "Ford Global Technologies, LLC" should be --Ford Motor Company--.

In the Claims

Column 14  
Claim 19, Line 64, "Selecting" should be --selecting--.

Signed and Sealed this  
Twenty-third Day of May, 2017

Michelle K. Lee  
*Director of the United States Patent and Trademark Office*